Oct. 16, 1951  J. P. LUDWIG  2,571,591
STRAIGHT KNITTING MACHINE
Filed Feb. 2, 1948  15 Sheets-Sheet 1

WITNESSES
Hubert Fuchs
Thomas W. Kerr Jr.

INVENTOR:
Johannes Paul Ludwig,
BY Paul & Paul
ATTORNEYS.

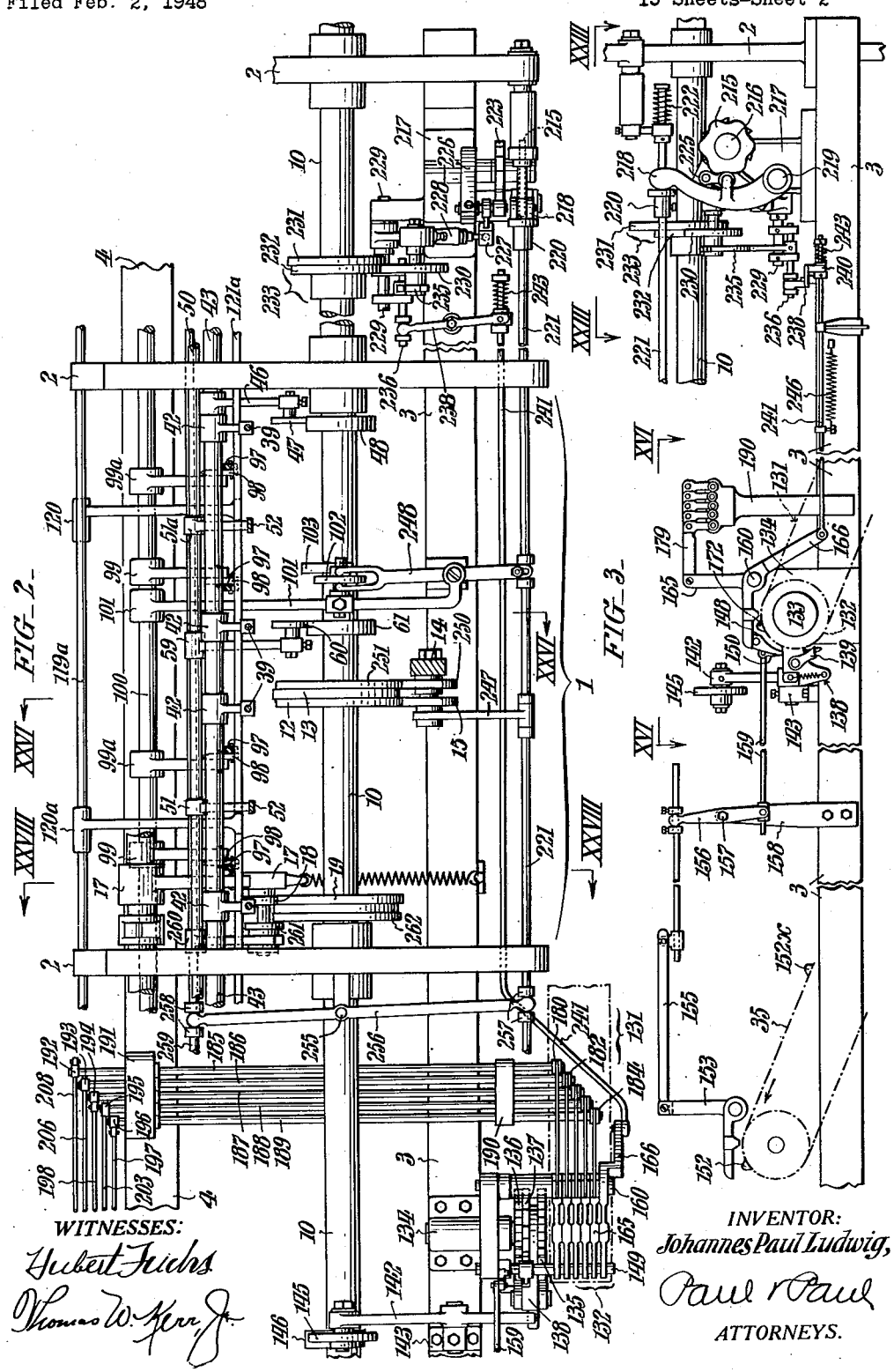

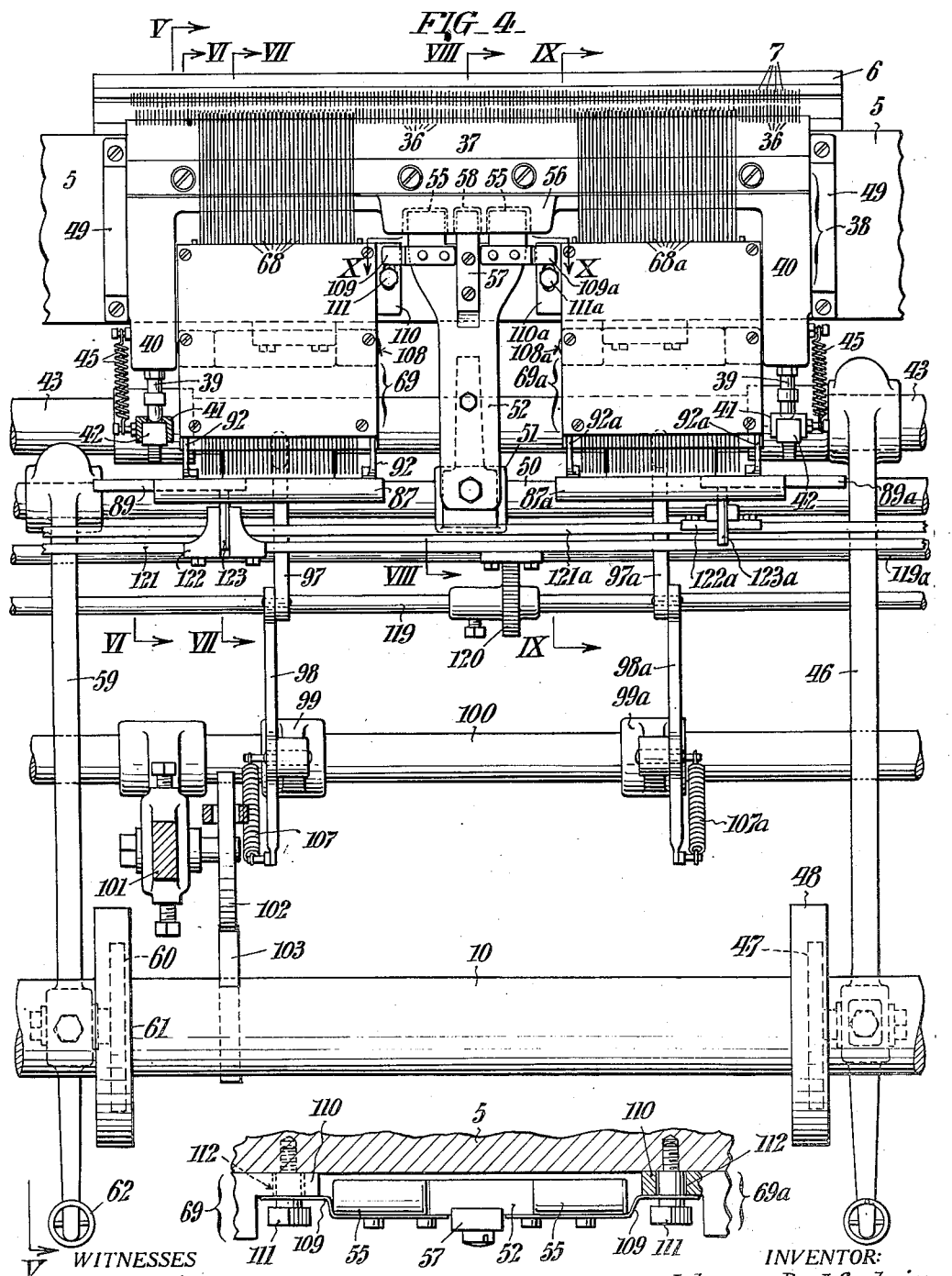

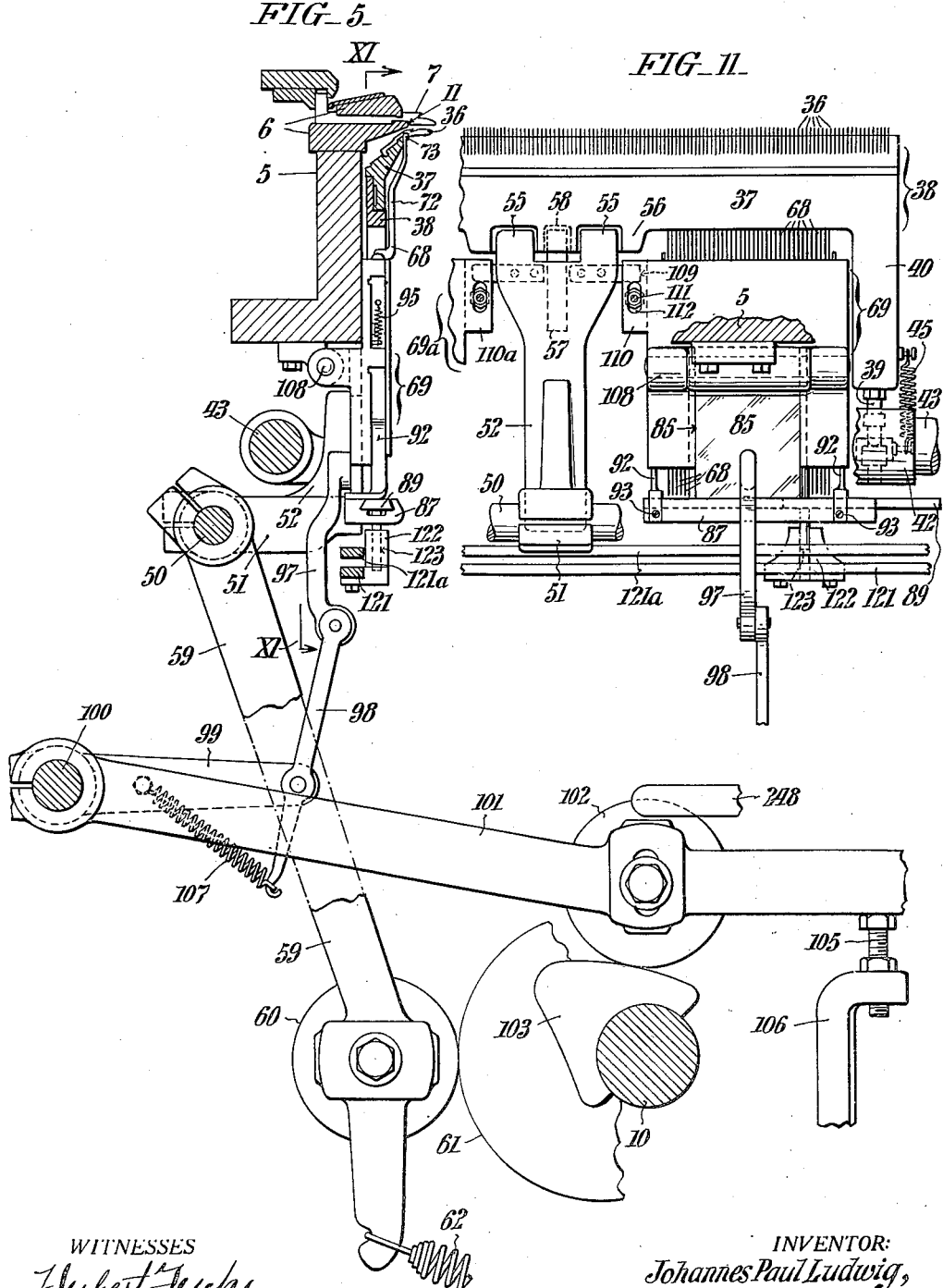

Oct. 16, 1951   J. P. LUDWIG   2,571,591
STRAIGHT KNITTING MACHINE
Filed Feb. 2, 1948   15 Sheets-Sheet 5
FIG_6_
FIG_7_
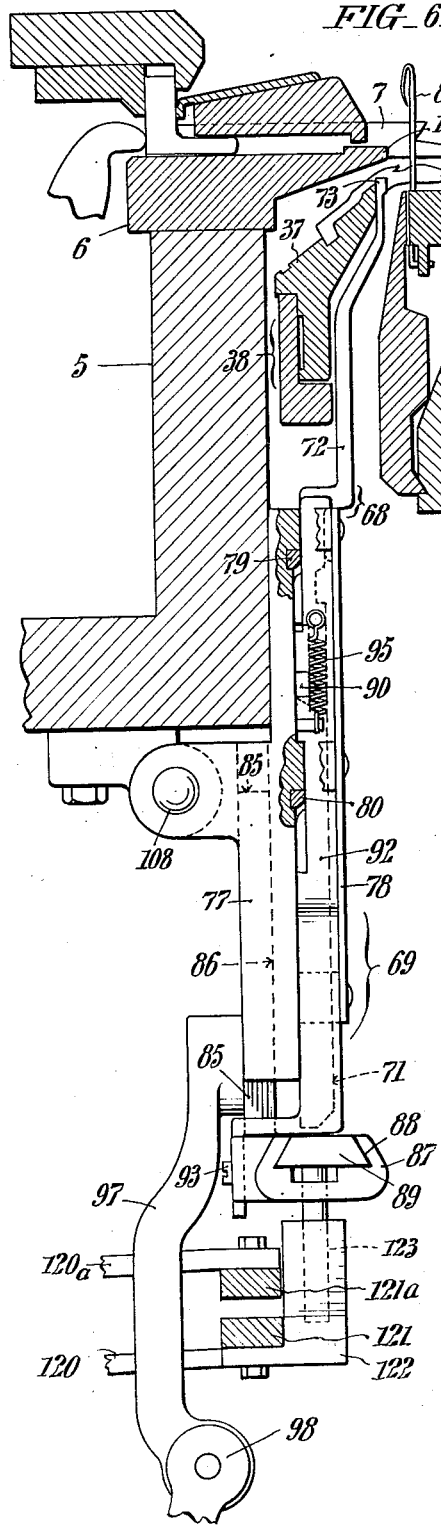
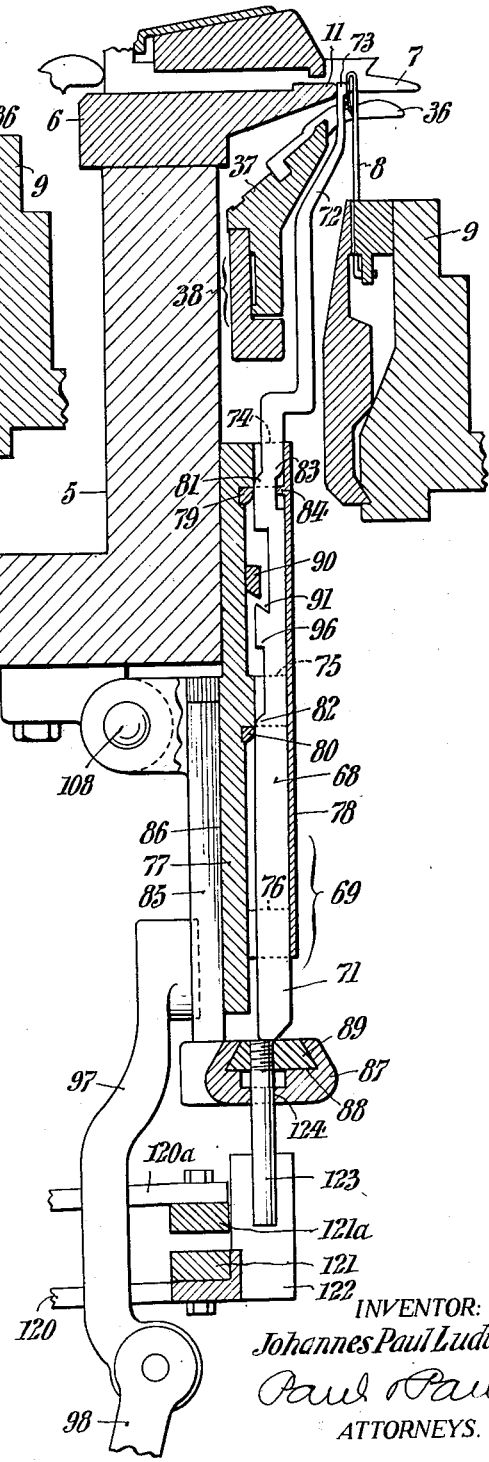
INVENTOR:
Johannes Paul Ludwig,
Paul & Paul
ATTORNEYS.

Oct. 16, 1951  J. P. LUDWIG  2,571,591
STRAIGHT KNITTING MACHINE
Filed Feb. 2, 1948  15 Sheets-Sheet 6
FIG. 8
FIG. 9
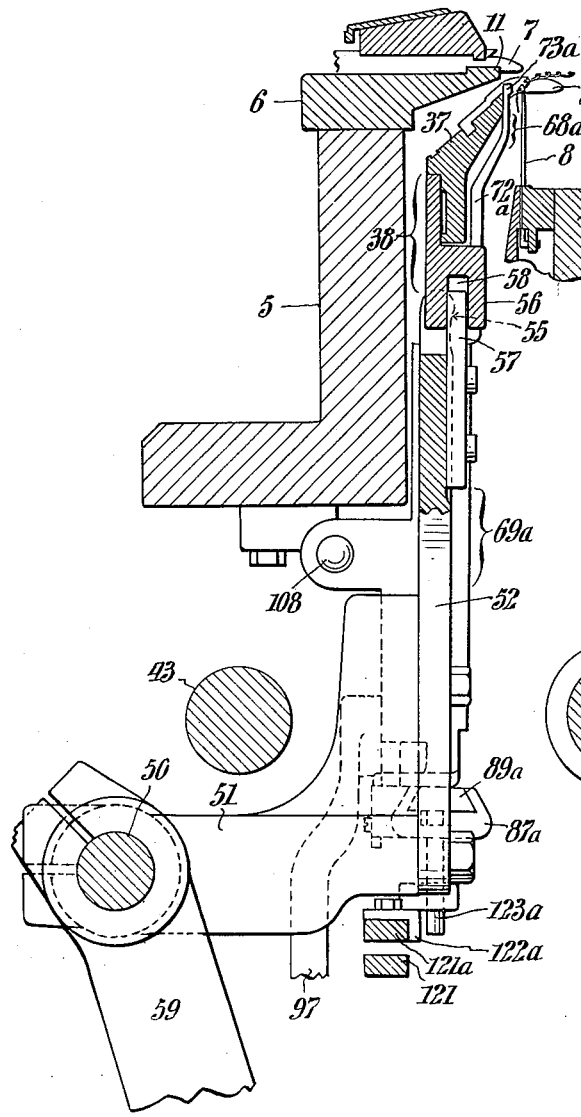
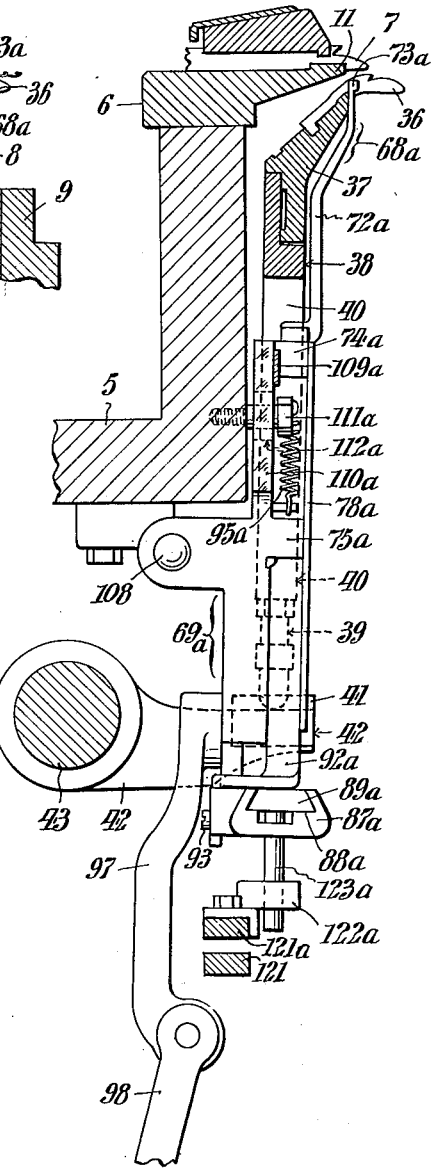
WITNESSES
Hubert Fuchs
Thomas W. Kerr, Jr.
INVENTOR:
Johannes Paul Ludwig,
BY Paul & Paul
ATTORNEYS.

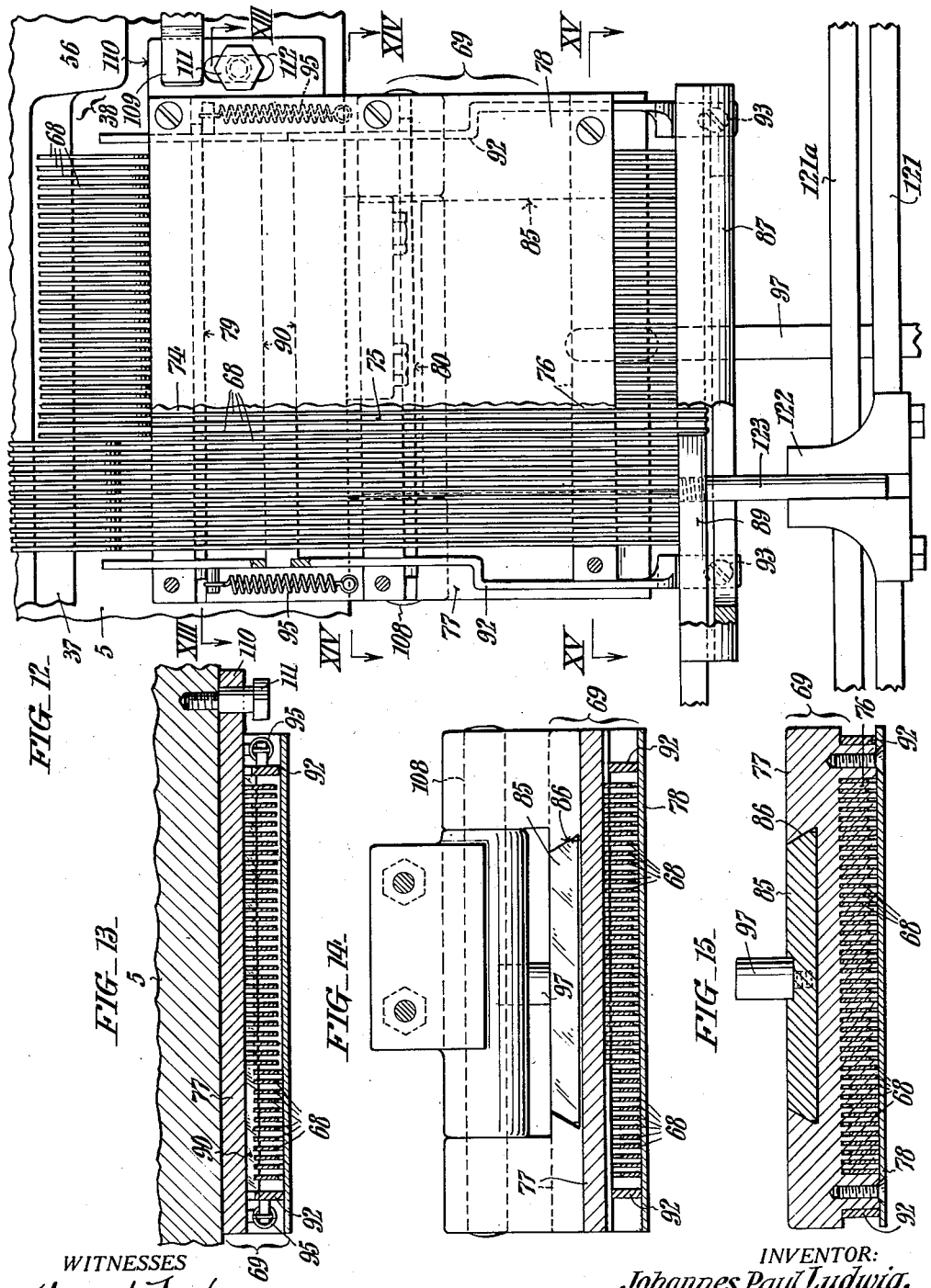

Oct. 16, 1951
J. P. LUDWIG
2,571,591
STRAIGHT KNITTING MACHINE
Filed Feb. 2, 1948
15 Sheets-Sheet 8
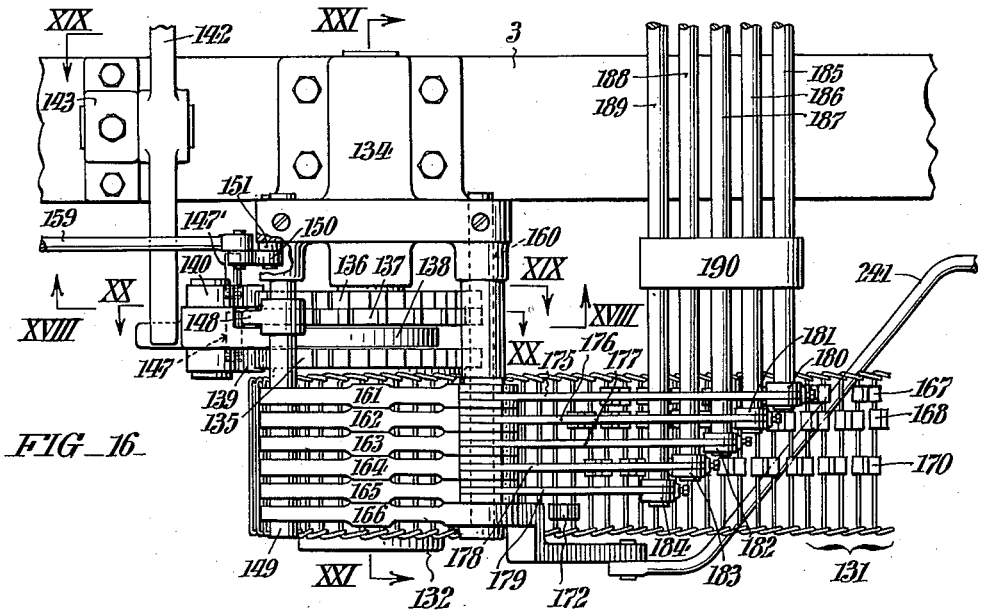
FIG_16_
FIG_17_
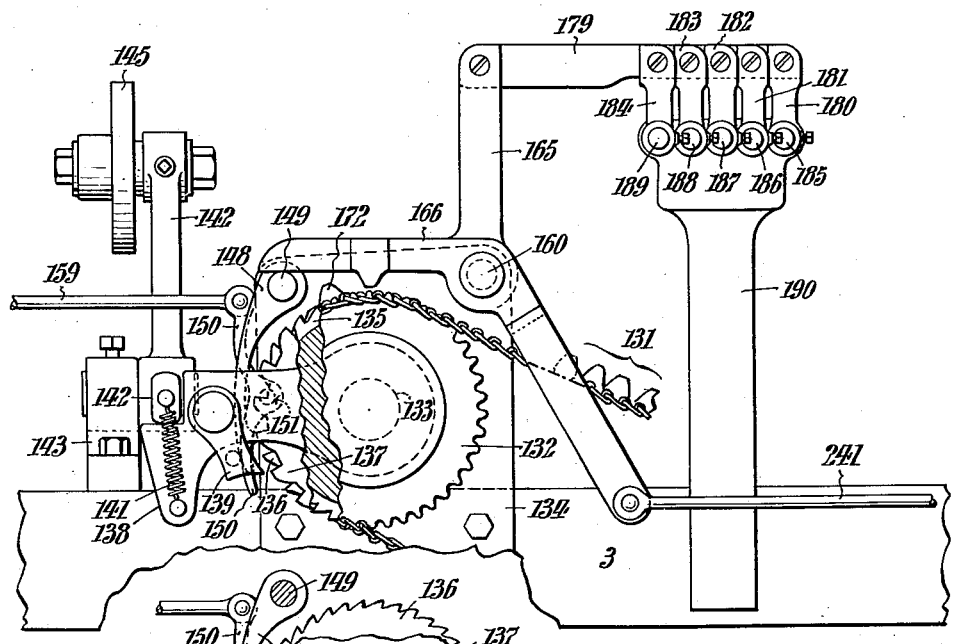
FIG_18_
INVENTOR:
Johannes Paul Ludwig,
BY Paul & Paul
ATTORNEYS.

Oct. 16, 1951        J. P. LUDWIG        2,571,591
STRAIGHT KNITTING MACHINE
Filed Feb. 2, 1948        15 Sheets-Sheet 9
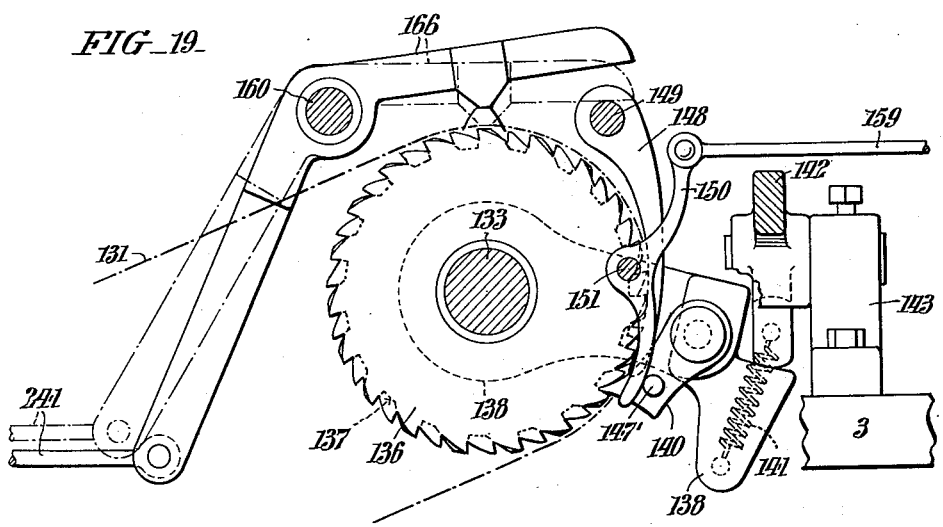
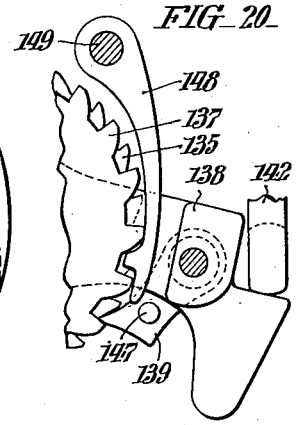
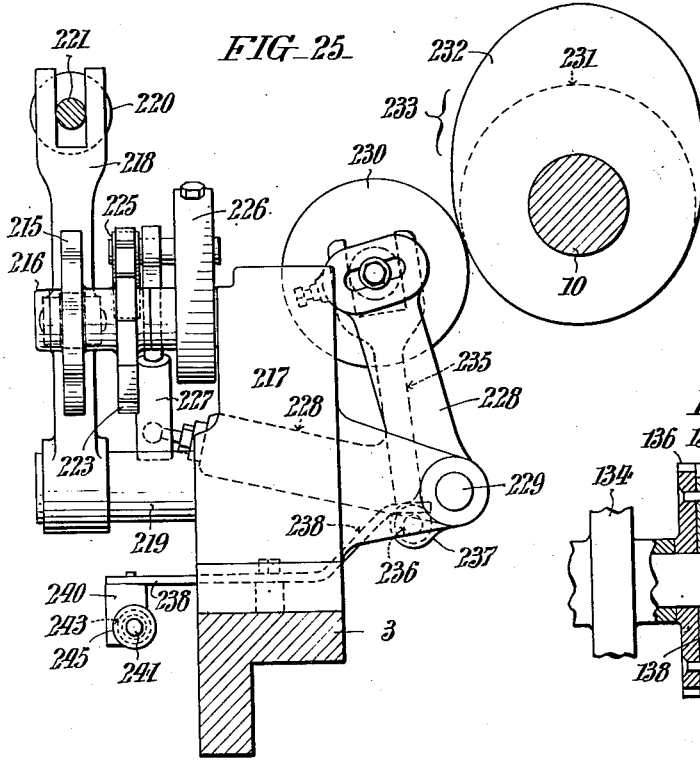
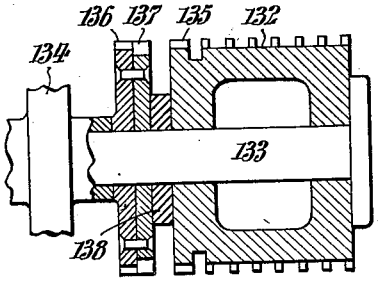
INVENTOR:
Johannes Paul Ludwig,
BY Paul & Paul
ATTORNEYS.

Oct. 16, 1951 J. P. LUDWIG 2,571,591
STRAIGHT KNITTING MACHINE
Filed Feb. 2, 1948 15 Sheets-Sheet 10
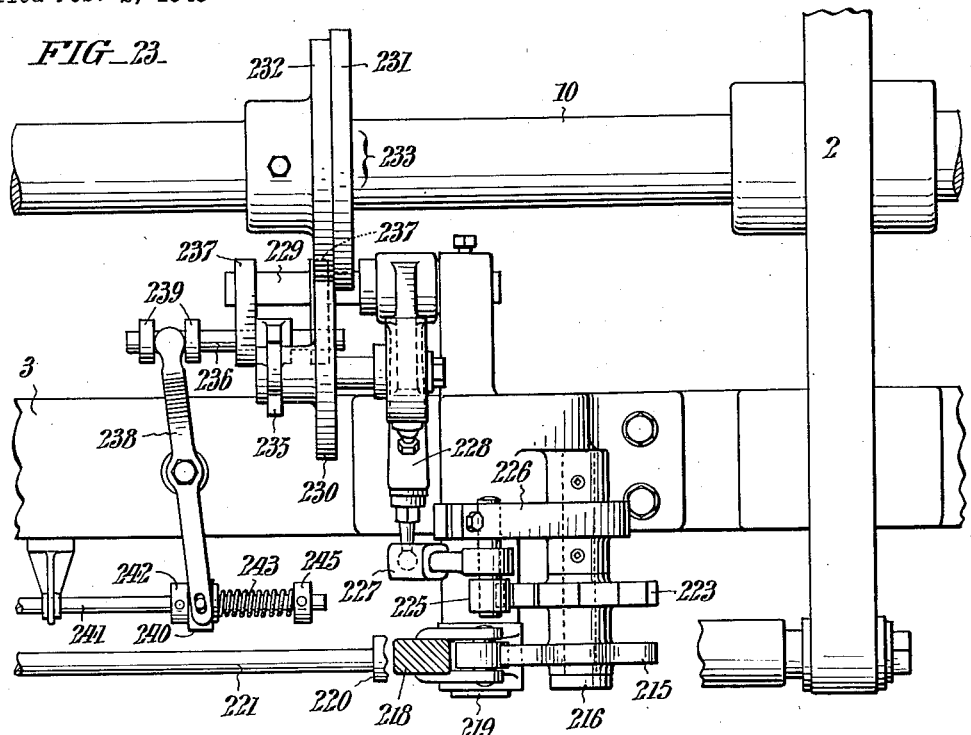
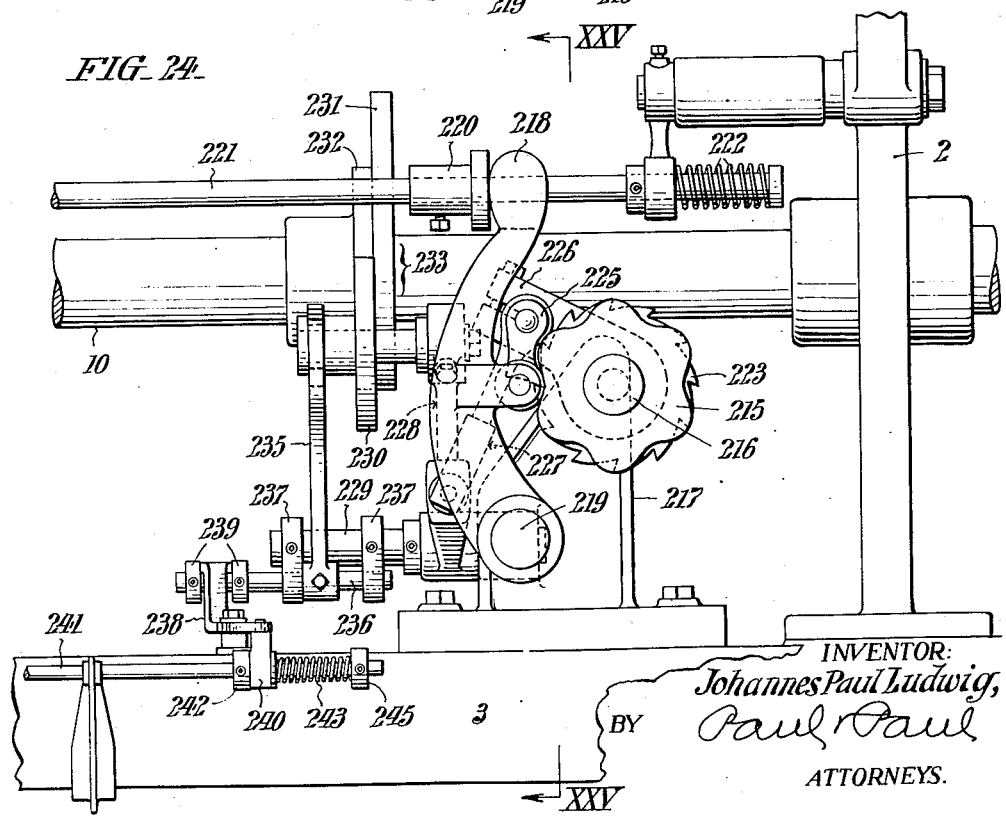
INVENTOR:
Johannes Paul Ludwig,
BY Paul & Paul
ATTORNEYS.

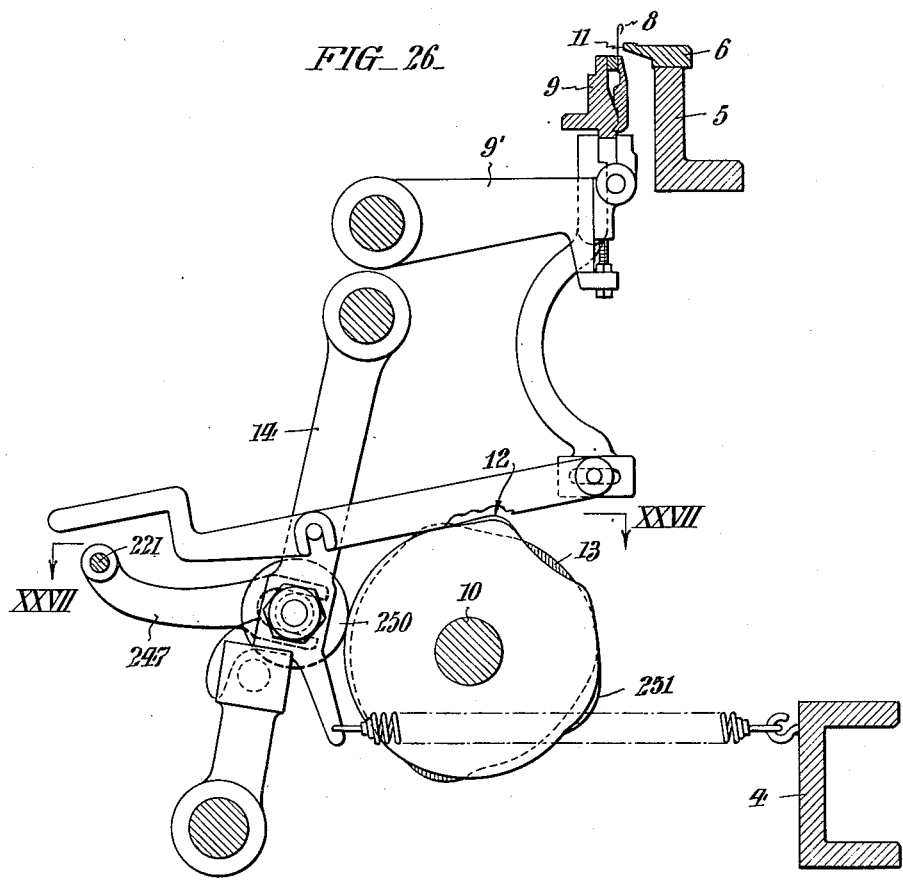
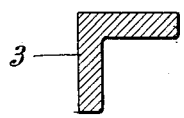
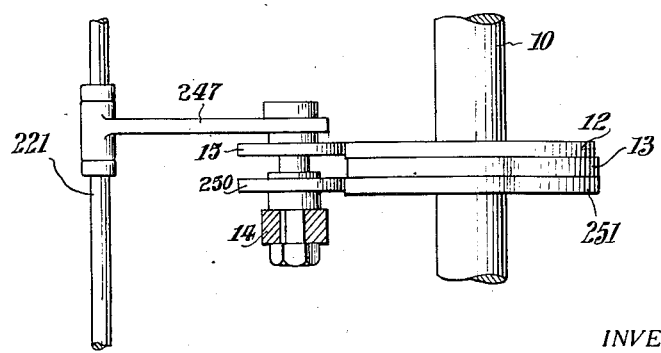

Oct. 16, 1951 J. P. LUDWIG 2,571,591
STRAIGHT KNITTING MACHINE
Filed Feb. 2, 1948 15 Sheets-Sheet 12
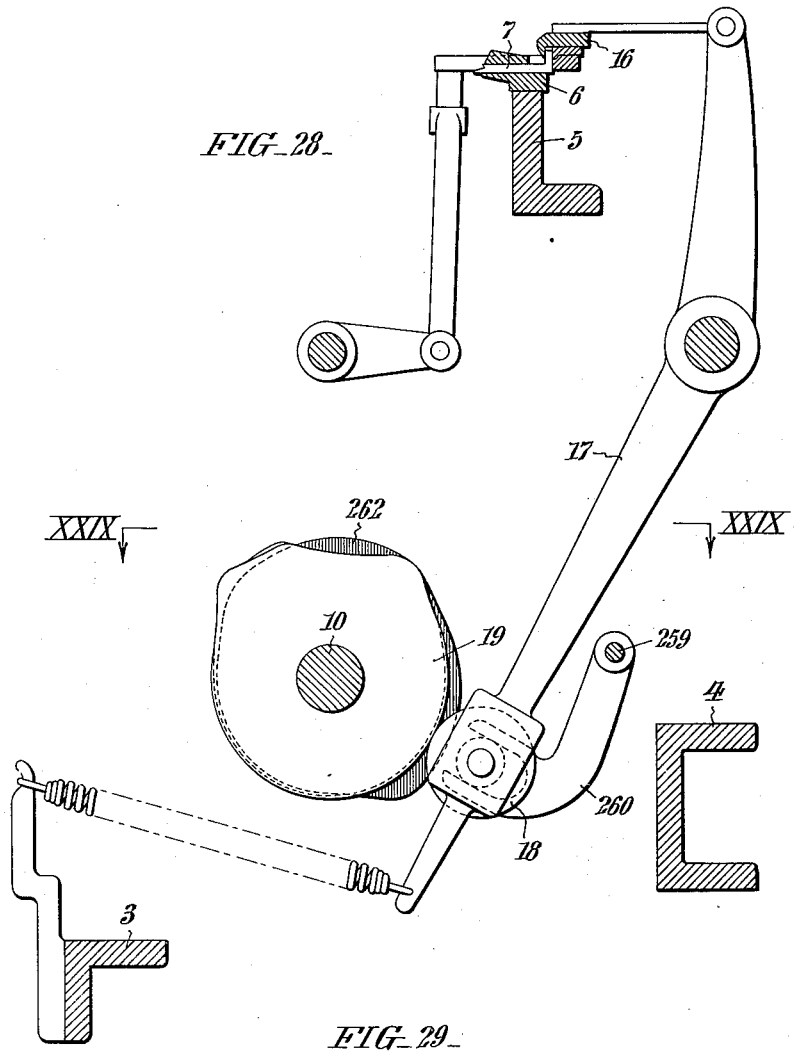
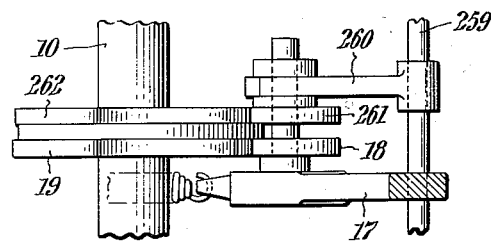
INVENTOR:
Johannes Paul Ludwig,
BY Paul & Paul
ATTORNEYS.

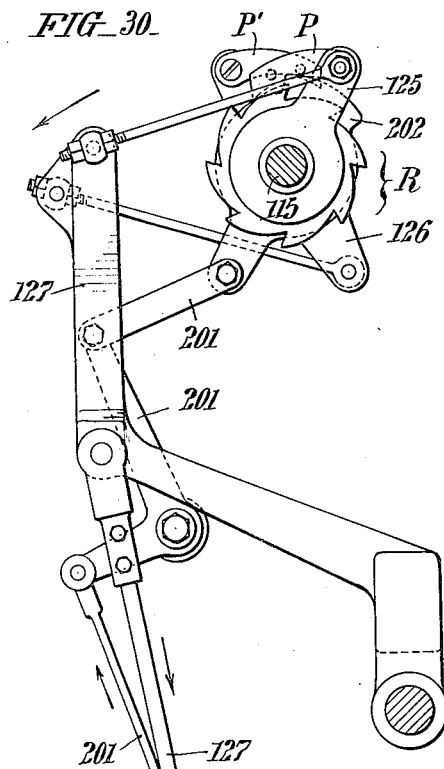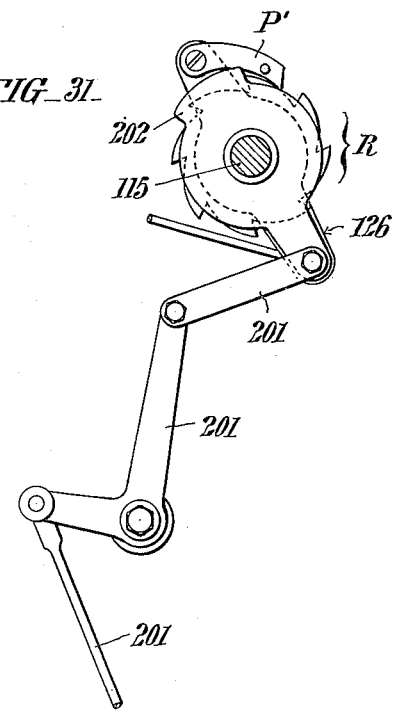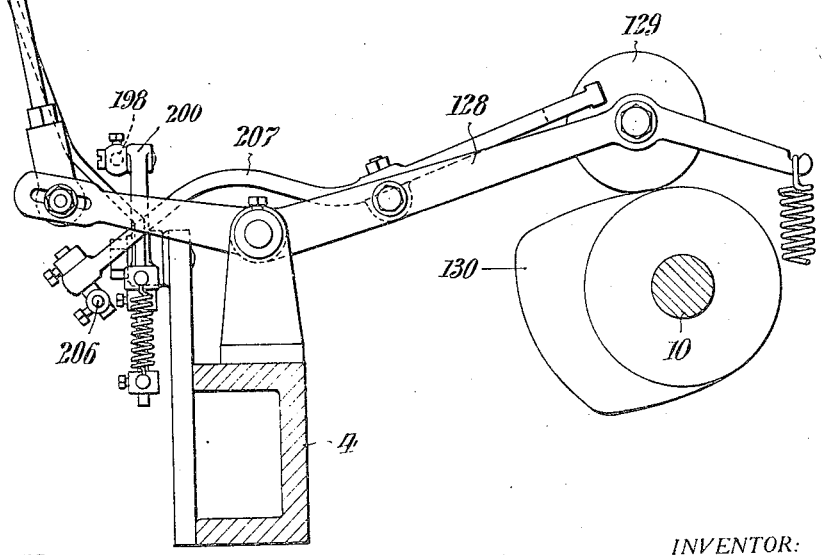

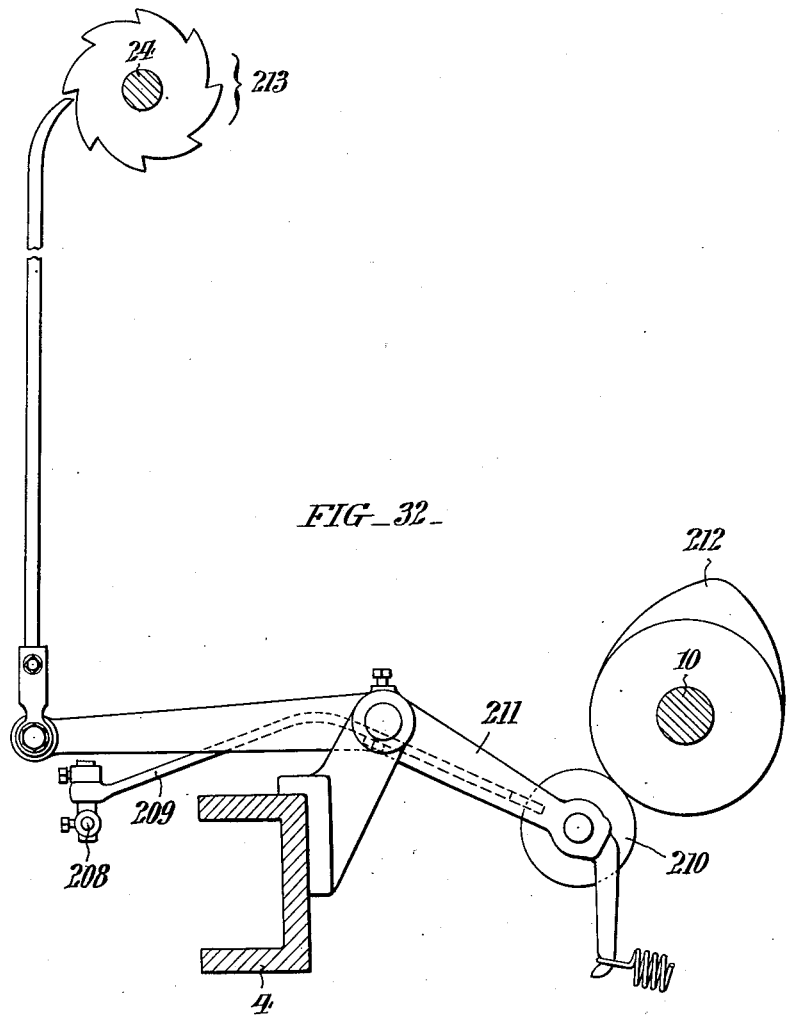

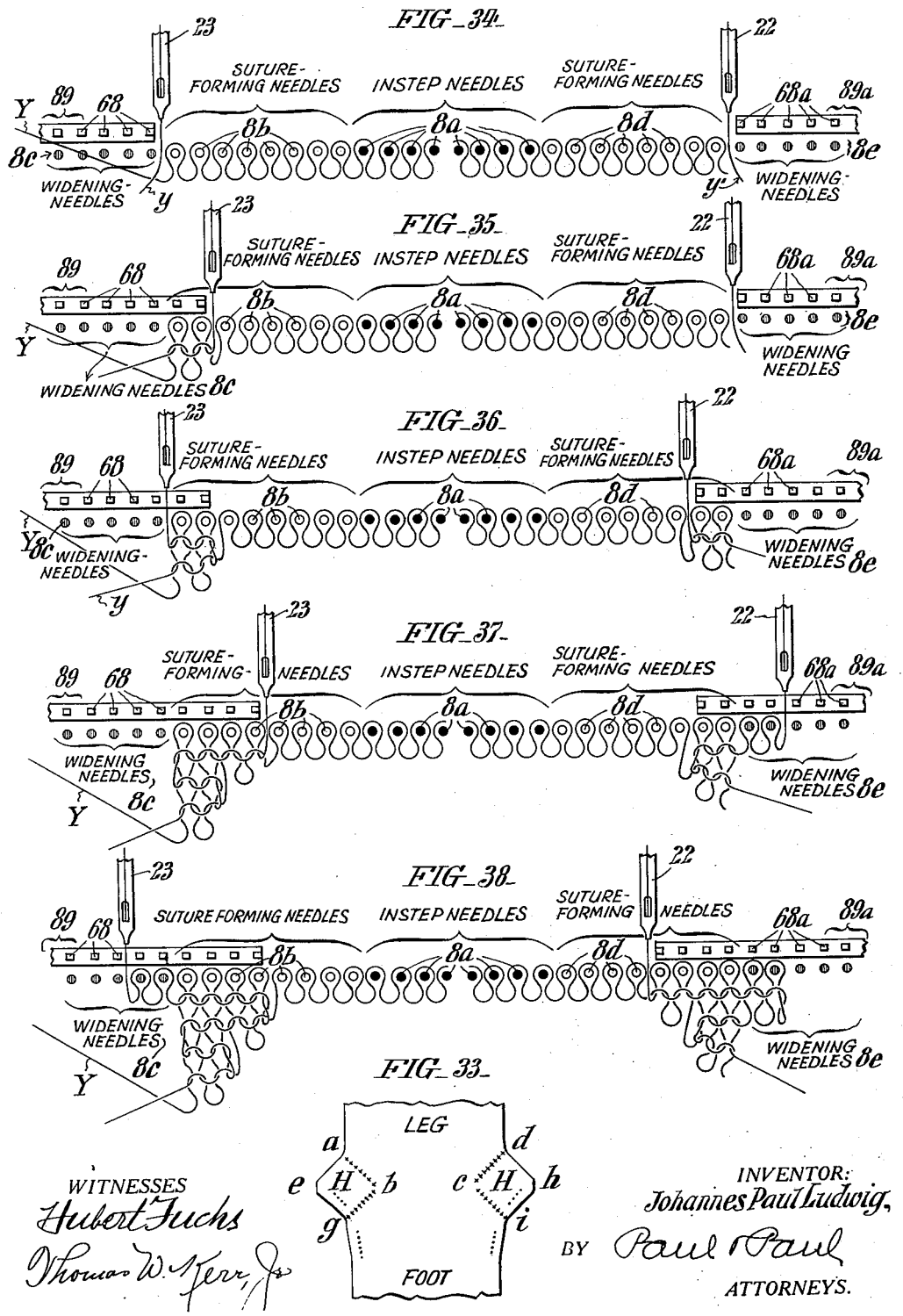

Patented Oct. 16, 1951

2,571,591

UNITED STATES PATENT OFFICE 2,571,591

STRAIGHT KNITTING MACHINE

Johannes Paul Ludwig, Milwaukee, Wis., assignor to Phoenix Hosiery Company, Milwaukee, Wis., a corporation of Wisconsin Application February 2, 1948, Serial No. 5,808

10 Claims. (Cl. 66—89)

This invention relates to straight knitting machines of the "Cotton" type ordinarily employed in the production of flat fashioned stocking blanks and the like. More particularly, it is concerned with straight knitting machines organized for the production, in one operation, of fashioned blanks with the legs and feet in direct continuation and characterized by having gusset heel cheeks or tabs. In United States Patent No. 2,430,882 granted to me on November 18, 1947, is disclosed such a machine wherein to form the heel tabs or cheeks, auxiliary bear presser elements individually associated with groups of end needles are brought into action in progressively increasing numbers, with incidental gradual increase in the traverse in opposite directions of two separate yarn carriers used in the heel knitting while intermediate instep needles are prevented from functioning, this action being carried out for a definite period whereupon the procedure is reversed for a corresponding period, with the result that the heel cheeks take the form of rectangular gussets at opposite sides of the blanks intermediate the ankle and foot portions.

The chief aim of my present invention is to provide in a knitting machine of the kind specifically referred to, improved mechanisms for governing variant selection of the auxiliary presser elements and for actuating them, and for controlling the traverse of the yarn carriers used in the formation of the heel cheeks, all with a view toward making possible smoother and more rapid operation of the machine and thereby enhance its efficiency for attainment of an increased output of the product therefrom.

Other objects and attendant advantages will appear from the following detailed description of the attached drawings, wherein Fig. 1 is a broken out fragmentary view showing the rear elevation of a straight knitting machine conveniently embodying the present improvements.

Fig. 2 is a horizontal section taken as indicated by the angled arrows in Fig. 1.

Fig. 3 is a broken out fragmentary view showing the lower part of the machine in front elevation.

Fig. 4 is a fragmentary view in front elevation of the upper part of the machine showing one of the knitting subdivisions.

Fig. 5 is a cross section taken as indicated by the angled arrows V—V in Fig. 4.

Figs. 6, 7, 8, and 9 are detail views in cross section taken as indicated respectively by the angled arrows VI—VI, VII—VII, VIII—VIII and IX—IX in Fig. 4.

Fig. 10 is a fragmentary detail view in horizontal section taken as indicated by the angled arrows X—X in Fig. 4.

Fig. 11 is a fragmentary view looking as indicated by the angled arrows XI—XI in Fig. 5.

Fig. 12 is a fragmentary view like Fig. 4 drawn to a larger scale with portions broken away to expose parts which would otherwise be concealed.

Figs. 13, 14 and 15 are detail views in horizontal section taken as respectively indicated by the angled arrows XIII—XIII, XIV—XIV, and XV—XV in Fig. 12.

Fig. 16 is a fragmentary view in plan looking as indicated by the angled arrows XVI—XVI in Fig. 3 and drawn to a larger scale.

Fig. 17 is a view in front elevation of the mechanism shown in Fig. 16.

Figs. 18, 19, 20 and 21 are detail sections taken as indicated respectively by the angled arrows XVIII—XVIII, XIX—XIX, XX—XX and XXI—XXI, in Fig. 16.

Figure 22:
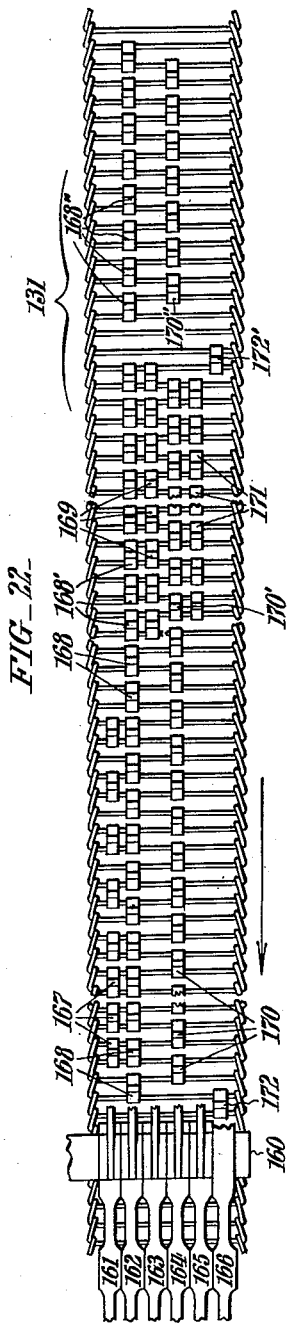

Fig. 22 is a broken out fragmentary view of a control chain forming part of the mechanism in Fig. 16.

Fig. 23 is a fragmentary view in plan looking as indicated by the angled arrows XXIII—XXIII in Fig. 3 and drawn to a larger scale.

Fig. 24 is a view in front elevation of the mechanism shown in Fig. 23.

Fig. 25 is a section taken as indicated by the angled arrows XXV—XXV in Fig. 24.

Fig. 26 is a cross section taken as indicated by the angled arrows XXVI—XXVI in Fig. 2 showing the needle press mechanism of the machine.

Fig. 27 is a fragmentary view in horizontal section taken as indicated by the angled arrows XXVII—XXVII in Fig. 26.

Fig. 28 is another cross section taken as indicated by the angled arrows XXVIII—XXVIII in Fig. 2 showing the catch bar actuating mechanism of the machine.

Fig. 29 is a fragmentary view in horizontal section taken as indicated by the angled arrows XXIX—XXIX in Fig. 28.

Figure 1:
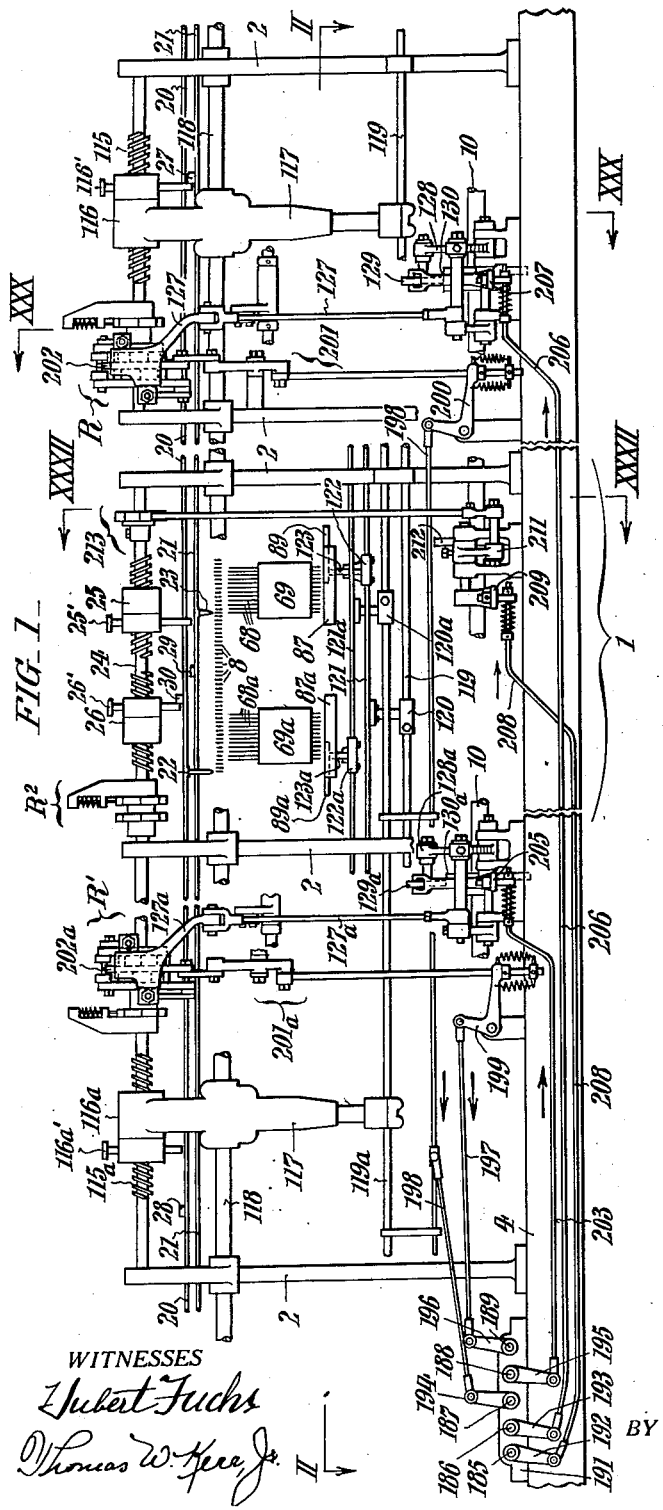

Fig. 30 is a transverse sectional view of the machine taken as indicated by the angled arrows XXX—XXX in Fig. 1.

Fig. 31 is a fragmentary view corresponding to Fig. 30 with certain of the parts differently positioned.

Fig. 32 is another transverse section taken as indicated by the angled arrows XXXII—XXXII in Fig. 1.

Fig. 33 is a fragmentary view showing the nether portion of one of the stocking blanks produced by the machine.

Figs. 34–38 are diagrammatic views showing successive steps in the formation of the heel tabs of the stocking blank.

With more detailed reference first more particularly to Fig. 1 of these illustrations, the numeral 1 comprehensively designates a knitting section (whereof there may be several) of the machine, the same occupying the interval between an adjacent pair of the transverse frames 2 which, after common practice, are united at the bottom by front and rear longitudinal beams 3 and 4, and at their tops by a longitudinal center rail or bed 5. Mounted on the center bed 5 is the guide head 6 for the usual horizontally slidable sinkers 7 which cooperate in a well known manner with spring beard needles 8. Up and down movements are imparted to the bar 9 which carries the needles 8 and which is pivotally connected to rocker arms 9' (Fig. 26), by appropriate mechanism (not shown) actuated from the cam shaft 10 of the machine. In and out movements are at the same time induced in the needle bar 9 incident to fabric loop formation for closure of the needles normally through engagement with a presser ledge 11 at the front of the sinker head 6, by the press mechanism shown in Fig. 26. This press mechanism comprises a rotary cam on cam shaft 10 having treads 12 and 13, and a system of levers including an arm 14 with a roller 15 arranged to ride the treads of said cam respectively during the ordinary phases of the knitting and during the fashioning phases when the cam shaft is shifted endwise after common practice in the art. The catch bar for retracting the sinkers 7 is shown at 16 in Fig. 28, the same being moved in and out by a rocker arm 17 having a roller 18 thereon running normally on the periphery of another rotary cam 19 on shaft 10. The mechanism for imparting the required up and down movements to the catch bar 16 may be of the customary construction and has therefore also been omitted from the drawings. Two of the yarn carrier bars of the machine are shown at 20 and 21 with their carriers 22 and 23 respectively. The carrier 22 I employ to feed a yarn y' (Figs. 34–38) during the knitting of the leg and foot portions of each stocking blank and also, as later explained, during the knitting of one of the heel cheeks, and the carrier 23 I employ to feed a separate yarn y during concurrent knitting of the other heel cheek. The couliering mechanism for actuating the yarn carrier rods is not illustrated since it too may be of conventional construction.

To control the inward traverse of the yarn carriers 22 and 23 during the heel knitting as also later on explained, I utilize (as in my patent hereinbefore referred to) a spindle 24 with left and right hand screw threads for oppositely shifting follower nuts 25 and 26 having stops 25', 26' for engagement by stop projections 29 and 30 respectively on said carrier rods. The forward and reverse racking mechanism R2 for the spindle 24 is operated in a well known way through movements derived from the cam shaft 10 under control of cam lugs on the usual narrowing chain 35 (Fig. 3) of the machine. For the purposes of my invention in the heel knitting, the narrowing chain 35 is provided with additional cam lugs (not shown) to effect the actuation of the racking mechanism R2 screw spindle 24.

Also cooperative with the needles 8 in the knitting are notched knock-over bits 36 which are secured in a bar 38. As shown in Figs. 4, 5, 9, and 11, downwardly projecting adjustable abutment studs 39 at the bottoms of the pendent end portions 40 of the knock-over bar 38 have their rounded ends engaged in socketed saddles 41 affixed to the ends of arms 42 which reach forwardly from a longitudinal rock shaft 43 suitably borne in the cross frames 2. Springs 45, exerting downward pull on the knock-over bar 38 at opposite ends thereof, serve to maintain the studs 39 engaged in the socketed saddles 41. Through a pendant arm 46 with a roller 47 thereon (Fig. 4), the shaft 43 is oscillated by another rotary cam 48 on the cam shaft 10 of the machine. By this means, the knock-over bits 36 are raised and lowered during each rotation of the cam shaft 10, and hence during the formation of each course of the knitting. From Fig. 4 it will be noted that the knock-over bar 38 is confined to vertical sliding movement between guides 49 affixed to the front face of the center beam 5.

In accordance with my present invention, lateral movements are imparted to the knock-over bar 38 by mechanism which includes another longitudinal rock shaft 50 having a horizontal arm 51 with an upright extension 52 bolted to its outer end. The top of this upright extension 52 is bifurcated as shown in Figs. 4, 8, and 11, with resultant provision of fingers 55 which engage behind a downward lug 56 medially of the knock-over bar 38. A tongue 57, secured centrally of the top of the arm extension 52, engages upwardly into a central recess 58 in the bottom of the lug 56, see Figs. 4 and 8, and thereby serves as an additional engaging means. The shaft 50 is oscillated through the medium of an attached arm 59 (Figs. 4 and 5) whereof the roller 60 rides the periphery of another rotary cam 61 on cam shaft 10, the roller being held to the cam by a spring indicated at 62. Thus, during each rotation of the shaft 10, the knock over bits 36 are moved upward and outward to the position shown in Figs. 8 and 9 to throw newly drawn fabric loops over the tops of the needles 8 before the latter rise to take fresh yarn for a succeeding course. During the heel cheek knitting, the in and out movements of the needle bar are modified, as described in my patent supra, to prevent contact of the beards of an intermediate group of needles with the presser ledge 11, while variant groups of end needles are caused to knit as later on explained. Pressing of the beards of the heel needles is accomplished in the present instance by means generally similar to that employed in my prior patent. For the description of this means reference will be had more particularly to Figs. 4–11, 12–15 wherefrom it will be observed that said means includes two groups of auxiliary presser elements 68 and 68a which are vertically slidable in boxes 69, 69a disposed forwardly of the front face of the center beam 5 immediately inward of the pendant portions 40 of the knock-over bar 38 and of the front face of the center beam 5 over the regions of the end groups of heel forming needles. Since the boxes 69, 69a and the parts associated with them are identical, the description which immediately follows of the former will be assumed to hold for the latter also. In practice, the presser elements 68 are struck from sheet metal and given the profile best shown in Fig. 7, their lower or shank portions 71 being straight, and their upper protruding portions 72 being outwardly offset and shaped to conform generally to the frontal configuration of the head portion of the knock-over bar. At their tops, the elements 68 terminate in thickened tips 73 each capable of acting on the beards of two adjacent needles. The shanks 71 of the presser elements 68 are engaged in vertical guide grooves of spaced horizontal ridges 74, 75 and 76 (Fig. 12) projecting forwardly from the rear wall 77 of the box 69, and are held in place by the removable front wall 78 of said box. Normally, the elements 68 occupy the retracted or lowered position in which they are shown in Fig. 6 clear of the needles, and when elevated to the position of Fig. 7, their thickened tips 73 are positioned immediately forward of and in contact with the presser edge 11 to engage the beards of the heel needles as the latter move downward in forming loops from newly fed yarn. In being lifted, the presser elements 68 are thrust outwardly somewhat to bring their tips 73 into line with the presser edge 11. This is accomplished, as shown in Fig. 7, through camming action between roundings 79 and 80 at the bottoms of the slotted horizontal guide ridges 74 and 75 on the rear wall 77 of the box 69 respectively with similar roundings 81 and 82 on the back edges of the elements. In being subsequently lowered, the elements 68 are displaced rearwardly to their normal positions through coaction between cam roundings 83 on their front edges with an inwardly projecting horizontal ridge 84 at the inner side of the box cover 78.

The means by which the auxiliary pressers 68 are raised and lowered includes a plate 85 which is confined to vertical movement in a dove tail guideway 86 at the back of the rear wall 77 of the box 69, and which has a forwardly extending horizontal ledge 87 at the bottom. The ledge 87 is provided with a longitudinal dove tail groove 88 which is occupied by a selector slide 89 hereinafter again referred to. Lowering of the elements 68 is effected by means of a pull down element in the form of a cross bar 90 within the box 69, said bar having a bevelled lower edge for engaging counter bevelled notches 91 in the inner edges of said elements. Connected to opposite ends of the bar 90 are pendent straps 92 (Fig. 6) which, at their bottoms, are secured to the ledge 87 by screws 93, see Figs. 6 and 12. Tension springs, shown at 95, pull downward upon the straps 92 and thereby tend to keep the ledge supporting plate 85 and the bar 90 lowered, with the shoulders 96 at the rear edges of the elements 68 resting on the top of the guide ridge 75, and with the bottoms of said elements clear of the slide 89 as in Fig. 6. Affixed to the rear of the plate 85 at the center is a pendent bracket arm 97 which, by means of a link 98 (Figs. 4 and 5), is connected to a laterally projecting arm 99 on another longitudinal rock shaft 100 with bearing support in the transverse frames 2 of the machine, said rock shaft being oscillatable through another arm 101 thereon with a roller 102 arranged to be actuated by another rotary cam 103 on cam shaft 10. Normally the roller 102 is withdrawn beyond the plane of the cam 103 as in Fig. 5, with the end of the arm 101 resting on an adjustable stop screw 105 in an upstanding bracket 106 on the front rail of the machine. A spring shown at 107 (Fig. 5) in tension between a stud on the arm 99 and a downward tail extension of the link 98, is influential in keeping the upper portion of the box 69 yieldingly in engagement normally with the front face of the center bed 5. In order that the presser elements 68 may follow the outward movement of the knock over bar 37 as the newly drawn fabric loops are displaced over the tops of the needles, the box 69 is hingedly connected at the rear to the center bar 5 as indicated at 108, this movement being relatively slight as shown in Figs. 8 and 9 and resisted by a spring finger 109 which is secured to the upward projection 52 of arm 51 with its free end bearing against a lateral offset 110 of said box as best shown in Figs. 4, 9, 10 and 11. The box 69 is held to the center bed 5, with allowance for the movement just described, by a headed bolt 111 whereof the shouldered shank is passed through a vertical slot 112 in the offset 110 of said box and engaged in said bed.

Variant selection of the auxiliary presser elements 68 is effected by shifting of the slide 89 through the means best shown in Figs. 1, 4 and 6. As illustrated, this means comprises a screw-spindle 115 which, in this instance, is rotatively supported at the top of the machine at one end, and which is arranged to be intermittently rotated to shift a follower nut 116 having a pendant extension 117 in sliding engagement with a longitudinally extending shaft 118. At its bottom end, the extension 117 of the nut 116 is secured to a rod 119 supported for endwise sliding movement in the transverse frames 2. Through a coupling element at 120, the rod 119 transmits its movements to a parallel bar 121 at a higher level similarly guided in the transverse frames 2. Affixed to the bar 121 is a forked bracket 122 which is engaged by a stud 123 extending down from the selector 89 through a longitudinal slot 124 (Fig. 7) in the ledge 87 of the slide plate 85 of the box 69. Accordingly, as the spindle 115 is rotated in one direction or the other, the selector 89 is correspondingly shifted to the right or left beneath the auxiliary presser elements 68 to select varying numbers of them as necessary in the heel cheek fashioning. A conventional form of reversible racking mechanism R, see Figs. 1 and 30, is relied upon to intermittently rotate the screw spindle 115 in opposite directions as required. In this mechanism, the arms 125 and 126 for the racking pawls P, P' are oscillated in a well known manner through the linkage connections indicated at 127, by an arm 128 with a roller 129 adapted to ride the periphery of another rotary actuating cam 130 on cam shaft 10. As shown, the follower nut 116 is provided with a stop 116' for engagement by another lug 27 on the carrier bar 21.

Identical mechanism is provided for selecting and actuating the auxiliary presser elements for the other end group of heel needles. Accordingly, in order to obviate the necessity for repetitive description, all the component parts of this duplicate mechanism have been identified by the same reference characters, with addition in each instance, of the letter "a" for convenience of distinction.

The narrowing phases of the machine for the shaping of the legs, heels and toes of the stocking blanks are determined in a well known manner through mechanism (not shown) under control of the usual narrowing chain which is indicated at 35 in Fig. 3. However, in accordance with my present invention, actuation of the screw spindles 115 and 115a incident to the heel cheek formation is controlled from a separate auxiliary chain 131 which is also illustrated in Fig. 3 and in Figs. 16, 17, 19, 21 and 22 as well. As shown, the auxiliary chain 131 is trained about a driving sprocket drum 132 which is freely rotative about a stud 133 projecting laterally from a bracket 134 on the front beam 3 of the machine, and to which is secured a ratchet wheel 135. Likewise free on the stud 133 are a second ratchet wheel 136 with an attached indexing wheel 137, and a swinging arm 138 which carries pawls 139 and 140 for picking the ratchets 135 and 136 respectively, said pawls being biased toward said ratchets by springs, not shown. The arm 138 is oscillated through maintenance of the engagement of its outer end, by a spring 141, with one arm of a lever 142 medially fulcrumed on another bracket 143 on the beam 3, the other arm of said lever carrying a roller 145 (Figs. 2 and 17) which is arranged to be actuated by another rotary cam 146 on cam shaft 10. Normally the pawl 139 is held retracted from the ratchet 135 through engagement of a stud 147 thereon by a guard finger 148 pivoted at 149 on the bracket 134 when said guard bears on one of the high spots of the indexing wheel 137 which comes to rest in the position shown in Fig. 18 at the consummation of each heel forming phase. Likewise normally, the pawl 140 is held retracted from the ratchet 136 by another guard finger 150 (Figs. 16 and 19) which is medially fulcrumed at 151 on bracket 134, and which normally occupies the position shown in Fig. 17. Thus, notwithstanding the continual swinging of the pawl arm 138, the auxiliary chain 131 normally remains inactive. Starting of the auxiliary chain 131 is controlled from the narrowing chain 35 which for this purpose is provided with a cam lug 152 (Fig. 3) for actuating a bell crank lever 153. Through a link 155 the bell crank 153 is connected to the upward extremity of a lever 156 centrally fulcrumed at 157 on still another bracket 158 on the beam 3, the downward extremity of said lever being in turn connected by a link rod 159 with the pawl guard 150. Accordingly, as the cam lug 152 on the narrowing chain 35 underpasses the bell crank 153, the pawl guard 150 will be shifted to release the pawl 139 and thereby permit racking of the drum 132 to progress the auxiliary chain 131 by one link each time for every other revolution of the cam shaft 10, under control of the indexing wheel 137.

Fulcrumed for independent movement about another lateral stud 160 on the bracket 134 adjacent the sprocket drum 132, are angular levers 161, 162, 163, 164, 165, and 166 whereof the horizontal extremities extend into the paths respectively of serially arranged lugs 167, 168, 168', 168'', 169, 170, 170', 170'', 171 and 172 transversely disposed on the auxiliary chain 131. The levers 161, 162, 163, 164 and 165 have upstanding extremities which, through horizontal links 175, 176, 177, 178 and 179 (Figs. 16 and 17), are connected to upright levers 180, 181, 182, 183 and 184 on rock shafts 185, 186, 187, 188 and 189 which extend crosswise of the machine, and which have bearing in brackets 190 and 191 (Fig. 2) on the front and rear beams 3 and 4. Affixed to the rear ends of the shafts 185, 186, 187, 188 and 189 (Fig. 1) are arms 192, 193, 194, 195 and 196. By means of horizontal link rods 197 and 198, the arms 196 and 194 are respectively connected to bell cranks 199, 200 which are connected in turn to vertical links 201 and 201a (see Fig. 1, 26 and 27) to control the guards 202, 202a for the forward and reverse pawls P, P' of the screw spindle racking mechanisms R and R'. A horizontal link rod 203 connects the arm 195 with a lever 205 (Figs. 1 and 26) arranged to shift the roller 129 on rocker arm 128 into and out of the path of the rotary cam 130 on cam shaft 10. Similarly, a horizontal link 206 connects the arm 193 with a lever 207 arranged to shift the roller 129a on rocker arm 128a into and out of the path of the rotary cam 130a. The arm 192 (Figs. 1 and 28) is connected in turn by a horizontal link rod 208, to a lever 209 by which the roller 210 on rocker 211 is shifted into and out of the path of rotary cam 212 to control pawling of the screw spindle 24 by a racking mechanism 213 and progressive increase in the outward traverse of the carrier rod 18 during the heel knitting. For shifting the roller 102 into and out of the range of the rotary cam 103 to cause lifting of the auxiliary presser elements 68 and 68a during the heel knitting, I have provided mechanism which is shown in Figs. 2 and 3. This mechanism includes a multi-lobed cam wheel 215 which is rotative about a lateral stud 216 on another bearing bracket 217 on the beam 3, and which acts upon a roller arm 218 free on another stud 219 projecting from said bracket. At its upper end, the arm 218 engages a collar 220 on a longitudinally extending slide rod 221 which is yieldingly urged to the right in Figs. 3 and 24 by a spring 222. Affixed to the cam wheel 215 is a ratchet 223 which is arranged to be operated by a pawl 225 on an arm 226 freely fulcrumed on the stud 216. Through a link 227, the pawl arm 226 is connected to a transversely arranged rocker arm 228 fulcrumed on a second stud 229 in the bracket 217 and carrying a roller 230 which is shiftable between eccentric and concentric tread portions 231 and 232 on another rotary cam 233 on cam shaft 10. Normally the roller 230 rides the concentric portion 232 of cam 233 to avoid racking of the cam wheel 215. The roller 230 is shiftable by means of a fork 235 on a short rock shaft 236 which is slidable endwise in supporting arms 237 affixed to the stud, by means of a horizontal lever 238 fulcrumed intermediate its ends on the beam 3. As shown, the lever 238 has its inner end engaged between a pair of collars 239 on the stud 236, while its outer end is pivotally connected to a collar 240 adjacent one end of a horizontal link rod 241, the other end of rod 241 is pivotally connected to the downwardly inclined extremity of the bell crank 166 previously referred to. The collar 240 is free on the rod 241 and held to a fixed collar 242 by a compression spring 243 whereof one end abuts another collar 245. The tension spring at 246 (Fig. 3) is influential upon the rod 241 to yieldingly urge the cam arm of bell crank 166 toward the sprocket drum 132. Connected to the rod 241 are forks 247 and 248. The fork 247 is relied upon to shift the roller 15 on arm 14 into and out of the path of the main press cam 12 on cam shaft 10 (Fig. 27), and the fork 248 to shift the roller 102 into and out of the path of rotary cam 103 on said shaft. During the heel knitting the press movement of the needle bar is modified through cooperation of another roller 250 on arm 14 with a special cam 251 adjacent cam 13 on cam shaft 10 to prevent direct contact of the needles with the presser ledge as set forth in my prior patent hereinbefore referred to. Centrally fulcrumed at 255 (Fig. 2) on a fixed pivot is a lever 256 whereof one end is engaged between a pair of collars 257 on control rod 221, and whereof the other end is similarly engaged between a pair of collars 258 on a supplemental longitudinal slide rod 259 at the rear of the machine. Secured to the supplemental slide rod 259 is a fork 260 for shifting another roller 261 on arm 16 (Fig. 28) into and out of the path of a special cam 262 alongside the cam 19 on cam shaft 10.

*Operation*

The leg portion of the flat stocking blank in Fig. 33 is produced in the usual way down to the line a—b—c—d at which the ankle terminates, from the yarn Y fed by the carrier 22, with the stop 116a' on the nut 116a retracted to permit full traverse of the carrier rod 20. Throughout the leg knitting, the auxiliary presser elements 68 and 68a were maintained in their lowered inactive positions as shown in Fig. 4, so that pressing of the needle beards takes place as ordinarily by direct contact with the presser ledge 11. At the completion of the leg portion of the stocking blank, the machine is stopped in preparation for the heel knitting, whereupon the stop 116a' is lowered and the carrier rod 20 is shifted to bring the lug 28 thereon into engagement with said stop, all as shown in Fig. 1. In diagrammatic Figs. 34–38 which will be later referred to in explaining how the heel cheeks H are formed from the yarns y and y', the left and right hand end groups of the needles are shown as apportioned respectively into two subdivisions or sectional groups 8b, 8c, 8d and 8e, the needles of such groups being conventionally indicated by small open circles and by small line-shaded circles. The open circle needles of the groups 8b and 8d are employed in the formation of the heel sutures, and the shaded circle needles of the subdivision 8c and 8e in outwardly widening the heel cheeks; while the central group of instep needles 8a (indicated by the small solid circles) remain idle throughout the heel knitting and temporarily hold their loops.

With the machine made ready as just explained above, it is restarted to automatically carry out the heel cheek knitting, this phase of the knitting being initiated by passage of the cam lug 152 on the main or narrowing chain 35 (Fig. 3) beneath the bell crank 153. As a result, through the linkage 155, 156 and 159, the pawl guard 150 (Fig. 17) is actuated to release pawl 140 which thereupon immediately picks a tooth of the ratchet wheel 136, with impartation to the latter and to the attached cam wheel 13 of a corresponding rotative shift. At the same time, a tooth of the ratchet wheel 135 is picked by the pawl 139 and the drum 132 of the auxiliary chain 131 thus turned by a linke amount. By this action, the first of the cam lugs 172 (Figs. 17 and 22) on auxiliary chain 131 is passed beneath and trips the bell crank 166 which, through the parts 241, 238 and 235 (Figs. 23 and 24), causes the roller 230 to be shifted into the path of the portion 231 of rotary cam 233 for a single revolution of cam shaft 10, incident to which the ratchet wheel 223 is picked one tooth by the pawl 225. A high spot on the cam wheel 215 is thereby brought opposite the roller 225 on finger 218 to shift the rod 221 leftward in Fig. 2 and to so hold it throughout the heel knitting, the supplemental rod 259 being at the same time shifted rightward by action of the lever 256. Due to connection of the forks 247 and 248 to the rod 221 and the fork 260 to the rod 259, the roller 15 is shifted off the main press cam 12 with attendant change in the in and out movement of the needle bar 9 by action of the special cam 251 on roller 15 of arm 14 to prevent contact of the needle beards with the presser ledge 11 during the heel knitting; the roller 102 shifted into the path of rotary cam 103 for actuation of the arm 101 (Fig. 5) whereby, through the linkage 99, 98 and 97 and slide plate 85, the selectors 89 and 89a are lifted to raise the auxiliary presser elements selected as presently pointed out to active position as shown in Fig. 7; and the roller 261 shifted onto the cam 262 for modification of the movements imparted to the catch bar. In the meantime, the auxiliary chain 131 is again racked through action of the pawl 139 upon the sprocket drum 132, and the first lug in the series 168 brought beneath the bell crank 162 (Figs. 1, 2 and 16) whereby, through the parts 176, 181, 186, 193, 206 and 207, the roller 129 (Fig. 30) is displaced into the path of rotary cam 130 on cam shaft 10 and the racking mechanism R operated to turn the screw spindle 115 in the proper direction for impartation to the follower nut 116 of an incremental shog inwardly in Fig. 1. Through the parts 119, 120, 121 and 122, this incremental movement is transmitted to the selector 89 so that the latter is shifted one step in the same direction to the extent of two needles from its initial position in Fig. 34 to the position in which it is shown in Fig. 35.

At the next pick of the drum 132 and chain 131, the first lug of the series 170 on the latter acutates the bell crank 164, and through the intervening parts 183, 188, 195, 203 and 205, causes the roller 129a of arm 128a to be moved into the path of cam 130a on cam shaft 10, with resultant actuation of the racking mechanism R' and impartation of a rotative shift to the screw spindle 115a. By the consequent outward movement of the follower nut 116a, the rod 119a is shifted in the same direction and with it the bar 121a and the selector slide 89a, the latter from the position of Fig. 35 to the broken line position in Fig. 36. On the next shift of the chain 131, the second lug of the series, in underpassing the bell crank 162, causes the selector 89 to be shifted from the position of Fig. 36 to the position of Fig. 37. On the fourth shift of the chain 131, the second lug of the series 170, in acting upon the bell crank 164, causes the selector 89a to be shifted from the position of Fig. 37 to the position of Fig. 38. In this way, the selectors 89 and 89a are shifted inward step by step with gradual increase in the number of the suture needles 8b and 8d first at one side and then at the other side of the stocking blank, until the last of the chain lugs of the series 168 and 170 have acted upon the bell cranks 162 and 164. Through the intermittent rotative shifts imparted to the screw spindles 115 and 115a during the above action, the stops 116' and 116a' are gradually moved inward to allow corresponding increases in the inward traverse of the yarn carriers 19 and 21 as exemplified in Figs. 34–38. Also during the above action, the spindle 24 is intermittently rotated to shift the stops 25' and 26' outwardly progressively and thereby allow increased outward traverses of the yarn carriers 22 and 23 so that more and more of the widening needles 8c and 8e are supplied with the yarns y and y'. The operation of the spindle 24, as just explained, is effected by action of the lugs 167 upon the bell crank 161 which, through the parts 175, 185, 192, 208, 209 (Figs. 16, 1 and 32), cause the roller 210 to be intermittently moved into the path of cam 212 on cam shaft 10, whereby, through the roller arm 211 and the connected pawl, the ratchet wheel of the racking mechanism 213 is picked. The procedure thus far described results in the formation of the upper triangular halves a—b—e and c—d—h of the heel cheeks H at the opposite sides of the stocking blank in Fig. 33. For the knitting of the lower complemental triangular halves e—b—g and c—h—i the procedure is reversed, i. e. the number of suture needles 8b and 8d and the inward traverse of the yarn carriers 22 and 23 are gradually decreased under the control of the lugs 168', 169, 170', and 171 of the special chain 13.

During this phase of the knitting, the lugs 169 and 171 act through the bell cranks 163 and 165 and the intervening parts hereinbefore described, to control the pawls 202 and 202a of the racking mechanisms for impartation of reverse rotative shifts of the screw spindles 115 and 115a. As a consequence, the selectors 89 and 89a are shifted outward progressively and the inward traverse of the yarn carriers 22 and 23 is correspondingly decreased. However during the first phase of the heel knitting, the reverse racking of the screw spindle 24 to gradually decrease the outward traverse of the yarn carriers 22 and 23 by the stops 29 and 30, is governed through control of the racking means at R2 in Fig. 1 by the narrowing chain 35 which is accordingly provided with additional lugs (not shown) to operate said means R2 through suitable intervening parts in a manner well known in the art. The heel knitting is terminated by passage of the lug 172' thereon beneath the bell crank 166 whereby the ratchet wheel 223 (Fig. 24) is pawled another tooth and the cam wheel 215 correspondingly turned so that the roller on finger 218 recedes into one of the peripheral notches of said cam. As a consequence, the rod 221 is shifted to the right by spring 222, and the supplemental control rod 259 at the back of the machine to the left, whereby the rollers 102 and 261 are removed from the cams 103 and 262 respectively and the roller 15 shifted back to cam 12, for restoration of the machine to normal condition. At the completion of the heel knitting, the machine is stopped, the stop 116a withdrawn and the yarn carrier shifted outward (to the right in Fig. 1) to its original position in readiness for the ensuing knitting of the stocking foot which may be accomplished in the usual manner. The special chain 131 continues in operation for some time after the completion of the heel knitting, during which time the lugs 168" and 170" thereon keep on actuating the screw spindles 115 and 115a to return the follower nuts 116 and 116a to their original positions. When this has been effected, the chain 131 is automatically stopped through actuation of the bell crank 150 by the lug 152x (Fig. 3) on the narrowing chain 35, the movement of said bell crank being communicated through the parts 155, 156 and 159 to the guard 150 (Figs. 17 and 18) which controls the pawl 140 of ratchet wheel 136.

Having thus described my invention, I claim:

1. In a straight knitting machine, a series of spring beard needles; a presser ledge; means for normally actuating the needles so that the beards of all of them engage the presser ledge; auxiliary means for actuating the needles at other times with prevention of contact of their beards with the presser ledge; normally retracted idle presser elements associated with individual needles of a sectional group of the series; means for positioning the presser elements at the aforesaid times between the needles of the sectional group and the presser ledge; a bar with knock-overs to cooperate with the needles; means for moving the knock-over bar outward relative to the presser ledge during fabric loop formation; and means fulcrumed on a fixed frame member of the machine and operative to cause the presser elements, when in active position, to move outwardly with the knock-over bar, as and for the purpose set forth.

2. The invention according to claim 1, further including means for selecting variant numbers of the presser elements for actuation by the positioning means as the knitting proceeds.

3. The invention according to claim 1, further including a cam shaft; and interposed connections whereby the means for positioning the presser elements and the means for moving them with the knock-over bar are actuated from the cam shaft.

4. In a straight knitting machine, a series of spring beard needles, a presser ledge; means for normally actuating the needles so that the beards of all of them engage the presser ledge; auxiliary means for actuating the needles at other times with prevention of contact of their beards with the presser ledge; presser elements associated with individual needles of a sectional group of the series and normally occupying a retracted position below the presser ledge; means for raising the presser elements at the aforesaid times to a position between the needles of the sectional group and the presser ledge; a bar with knock-overs to cooperate with the needles; means for imparting lift and lateral movements to the knock-over bar during the knitting of successive fabric courses; and means fulcrumed on a fixed frame member of the machine operative to cause the auxiliary presser elements while raised, to move outwardly en masse with the knock-overs, as and for the purpose set forth.

5. The invention according to claim 4, further including means for selecting variant numbers of the presser elements for actuation by the raising means as the knitting proceeds.

6. The invention according to claim 4, further including a cam shaft, and interposed connections whereby the means for raising the presser elements and the means for moving them with the knock-over bar are actuated from the cam shaft.

7. In a straight knitting machine, a series of spring beard needles; a presser ledge; means for normally actuating the needles so that the beards of all of them engage the presser ledge; auxiliary means for actuating the needles at other times with prevention of contact of the beards with the presser ledge; normally idle presser elements associated with individual needles of a sectional group and normally disposed beneath the presser ledge; a holder in which the presser elements are constrained to up and down movement, said holder being pivoted for rocking movement about a horizontal axis on a fixed frame member of the machine; means for raising the presser elements during the aforesaid other times to a position between the needles of the sectional group and the presser ledge; a bar with knock-overs to cooperate with the needles individually; means for moving the knock-over bar outward relative to the presser ledge and for concurrently rocking the holder containing the presser elements while the latter are raised, as and for the purpose set forth.

8. The invention according to claim 7, further including a selector slide arranged to be shifted beneath the presser elements in the holder; and means operative to shift the slide to select variant numbers of the presser elements for actuation by the raising means as the knitting proceeds.

9. In a straight stocking knitting machine, a series of spring beard needles and a presser ledge; means for normally actuating the needles so that their beards engage the presser ledge; auxiliary means for actuating the needles at other times to prevent contact of their beards with the presser ledge; presser elements individually associated with needles of two sectional groups respectively at opposite ends of the series and normally occupying retracted idle positions beneath the presser ledge; means for selecting different numbers of the presser elements of the two groups for operation upon corresponding needles in fashioning the heel portions of the stockings, including slides respectively arranged beneath them; means for shifting the slides including two separate screw spindles with follower nuts thereon connected to the respective slides and mechanism for intermittently rotating the spindles in alternation first for a time in one direction, and then for a time in the opposite direction; means for raising the slides to move the selected presser elements to active positions between the presser ledge and the corresponding needles; reciprocating carriers for respectively feeding separate heel yarns to the two end groups of the needles; a separate intermittently-rotated screw spindle means with oppositely pitched thread portions and stop nuts thereon for varyingly limiting the inward traverse of the respective yarn carriers to correspond with inward shifts of the selector slides; and mechanism for intermittently rotating the last mentioned spindle means.

10. A knitting machine according to claim 9, further including a main timing chain and an auxiliary timing chain; means through which the auxiliary timing chain is intermittently progressed from the main timing chain; means through which the operation of the first mentioned spindles is controlled from the auxiliary timing chain; and means through which the operation of the second mentioned spindle means is controlled from the main timing chain.

JOHANNES PAUL LUDWIG.

REFERENCES CITED

The following references are of record in the file of this patent:

UNITED STATES PATENTS

| Number | Name | Date |
|---|---|---|
| 2,009,925 | Heinitz | July 30, 1935 |
| 2,062,222 | Heinitz | Nov. 24, 1936 |
| 2,374,294 | Maier | Apr. 24, 1945 |
| 2,395,908 | Richter | Mar. 5, 1946 |
| 2,430,882 | Ludwig | Nov. 18, 1947 |